US012583778B2

(12) United States Patent
Cox et al.

(10) Patent No.: US 12,583,778 B2
(45) Date of Patent: Mar. 24, 2026

(54) WATER REMEDIATION SYSTEM

(71) Applicant: HYDROLIZE LIMITED, Bristol (GB)

(72) Inventors: Andrew Cox, Stroud (GB); Jack Lee, Bristol (GB)

(73) Assignee: HYDROLIZE LIMITED, Bristol (GB)

( * ) Notice: Subject to any disclaimer, the term of this patent is extended or adjusted under 35 U.S.C. 154(b) by 661 days.

(21) Appl. No.: 17/794,702

(22) PCT Filed: Jan. 25, 2021

(86) PCT No.: PCT/GB2021/050169
§ 371 (c)(1),
(2) Date: Jul. 22, 2022

(87) PCT Pub. No.: WO2021/148822
PCT Pub. Date: Jul. 29, 2021

(65) Prior Publication Data
US 2023/0039534 A1      Feb. 9, 2023

(30) Foreign Application Priority Data

Jan. 24, 2020    (GB) ...................................... 2001049

(51) Int. Cl.
| | |
|---|---|
| *C02F 9/00* | (2023.01) |
| *C02F 1/00* | (2023.01) |
| *C02F 1/28* | (2023.01) |
| *C02F 1/32* | (2023.01) |
| *C02F 1/42* | (2023.01) |

(Continued)

(52) U.S. Cl.
CPC ................ *C02F 9/00* (2013.01); *C02F 1/001* (2013.01); *C02F 1/28* (2013.01); *C02F 1/32* (2013.01); *C02F 1/42* (2013.01); *C02F 1/467* (2013.01); *C02F 1/52* (2013.01); *C02F 1/66*
(2013.01); *C02F 1/686* (2013.01); *C02F 1/727* (2013.01); *C02F 2101/105* (2013.01);
(Continued)

(58) Field of Classification Search
None
See application file for complete search history.

(56) References Cited

U.S. PATENT DOCUMENTS

| | | | | |
|---|---|---|---|---|
| 2001/0004962 A1* | 6/2001 | Hirota | ................... | C02F 1/4674 |
| | | | | 204/228.1 |
| 2002/0030012 A1* | 3/2002 | Sullivan | ................... | C02F 9/00 |
| | | | | 210/705 |

(Continued)

FOREIGN PATENT DOCUMENTS

| | | |
|---|---|---|
| AU | 2012203486 A1 | 7/2012 |
| CN | 105384285 | 10/2017 |

(Continued)

OTHER PUBLICATIONS

International Search Report dated Apr. 23, 2021; International Application PCT/GB2021/050169.

*Primary Examiner* — Peter Keyworth
(74) *Attorney, Agent, or Firm* — Dinsmore & Shohl LLP

(57) ABSTRACT

A water remediation system and accompanying method includes remediation by reducing the concentration of nutrients in the water and dosing the water with metal ions. It has been found that through a combination of reducing nutrients present in the water and treating with metal ions, the requirement to treat with high chemical dosages is removed.

10 Claims, 3 Drawing Sheets

(51) Int. Cl.

| | | |
|---|---|---|
| C02F 1/467 | (2023.01) | |
| C02F 1/52 | (2023.01) | |
| C02F 1/66 | (2023.01) | |
| C02F 1/68 | (2023.01) | |
| C02F 1/72 | (2023.01) | |
| C02F 101/10 | (2006.01) | |
| C02F 101/16 | (2006.01) | |
| C02F 103/42 | (2006.01) | |

(52) U.S. Cl.
CPC ...... *C02F 2101/16* (2013.01); *C02F 2103/42* (2013.01); *C02F 2209/06* (2013.01)

(56) References Cited

U.S. PATENT DOCUMENTS

| 2003/0089668 | A1 | 5/2003 | Moffett | |
|---|---|---|---|---|
| 2006/0027463 | A1* | 2/2006 | Lavelle | C02F 1/4674 |
| | | | | 205/556 |
| 2006/0175255 | A1* | 8/2006 | Bauer | C02F 1/48 |
| | | | | 210/634 |
| 2009/0223903 | A1 | 9/2009 | Coffey et al. | |
| 2011/0089049 | A1* | 4/2011 | Musson | C02F 3/202 |
| | | | | 204/287 |
| 2012/0223022 | A1 | 9/2012 | Hassler | |
| 2013/0264197 | A1* | 10/2013 | Zhang | C02F 1/463 |
| | | | | 204/275.1 |
| 2019/0144319 | A1 | 5/2019 | Luciano | |

FOREIGN PATENT DOCUMENTS

| CN | 108033604 A | 5/2018 |
|---|---|---|
| CN | 108675549 A | 10/2018 |
| CN | 109179918 A | 1/2019 |
| CN | 110015803 A | 7/2019 |
| DE | 3603123 | 8/1987 |
| JP | S63200899 A | 8/1988 |
| WO | 0236499 A2 | 5/2002 |

* cited by examiner

WATER REMEDIATION SYSTEM

CROSS-REFERENCE TO RELATED APPLICATIONS

This application is the U.S. National Stage of PCT/GB2021/050169 filed on Jan. 25, 2021, which claims priority to United Kingdom Patent Application 2001049.2 filed on Jan. 24, 2020, the entire content of both are incorporated herein by reference in their entirety.

FIELD OF THE INVENTION

The present invention relates to a water remediation system for use in remediation of water for various purposes ranging from remediation for drinking to remediation in a swimming pool environment.

BACKGROUND OF THE INVENTION

Treatment is required for water that will both come into contact with, and be consumed by, humans. Phosphates are compounds of the non-metallic element phosphorous and are a primary food source for all life forms including all types of algae and other microorganisms. Phosphate compounds are broken down into their simplest form, ortho-phosphates, by either oxidation (converting compounds into oxides), hydrolysis (decomposition by water) or enzymatic digestion. Regardless of how it happens, if phosphates are allowed to remain present in water, including but not limited to pool, spa, or pond water, they will be reduced to ortho-phosphates, which are a form of phosphates that algae can readily digest. If this happens, then algae growth is accelerated, potentially leading to an algal bloom.

The challenge with phosphates is that they are constantly being introduced into water. With respect to swimming pool water for example they are found in lawn and garden fertilizers, decaying vegetation, rain, dust, cosmetic items on bathers, organic matter on bathers, skin, sweat, urine, faecal matter and even other pool chemicals. This means a fresh batch of phosphates risk entering the water when any of the following occur: the wind blows dirt into pool: sprinkler run-off from the lawn enters the pool: the pool water leveller inputs fresh mains water: leaves or twigs enters the water; someone swims in the water and certain chemicals containing any amount of phosphoric, phosphonic or other phosphorous based ingredients are dosed into the pool.

Accordingly, phosphates can never be completely removed from entering the water. Instead, a basic mechanism for phosphate management, and consequently algal management, is to limit the risk of entry of phosphates into the pool as far as possible through, for example, regular maintenance by removing organic detritus and washing before bathing. However, this is insufficient to prevent phosphates in the water and accordingly to prevent significant algae growth. The second commonly used approach is to provide a filtration step comprising a particulate filter through which water flows to remove the majority of suspended solids. This removes larger phosphate containing debris but generally leaves some behind and those that do get removed chemically break down, releasing phosphate, unless they are physically removed from the filter (e.g., by backwashing). The third approach used in combination with other approaches is to maintain high water recirculation rates/pool turnover times, which in combination with the second approach has a detrimental effect upon the ability for algae to grow by reducing the residence time of nutrients in the main water body. Whilst these approaches to reduce phosphates in the water have an effect, they are insufficient to prevent significant algae growth of biological films or aquatic algae.

The well-known and used approach to minimising algae in water systems, particularly those such as swimming pool systems is to control the pathogens and algae directly using cell destroying chemicals. Chemical disinfectants, such as chlorine, are well known additives, typically in the range of 0.2-3 ppm. Chlorine acts to kill both algae and other pathogens such as viruses, bacteria and protozoa. However, introduction of chlorine levels into swimming pool water at 3 ppm is six times higher than regulations allow in the UK for tap water, meaning the effects on users is damage to human health, especially when chlorine by-products are generated. Typical experiences for users are skin irritations, stinging eyes and unpleasant smells. By-products from chemicals include trihalomethanes (THMs), which are scientifically proven to damage human health.

The requirement for high levels of chemicals such as chlorine is usually to control algal growth rather than pathogens, which typically require significantly lower chemical treatment levels.

SUMMARY OF THE INVENTION

Whilst chemical treatment of water does provide water which is safe to bathe in and is safe to drink, there are significant disadvantages associated with the addition of disinfectant chemicals as presented above. The present invention aims to address the above-mentioned problems or at least provide an alternative choice.

According to an aspect of the present invention there is a method of remediating water comprising:

reducing the concentration of nutrients in the water;

dosing the water with metal ions.

It has been found that through a combination of reducing nutrients present in the water and treating with metal ions, the requirement to treat with high chemical dosages is removed. This is contrary to the usual method of water treatment which treats the effect of excess nutrient content in the water (algae proliferation) rather than treatment of the nutrient source itself. This is particularly important in a swimming pool environment which is continually subjected to input of organic nutrients from bather loading as a result of sweat, skin and urine for example and also depending on the environment in which the pool is situated environmental inputs such as dust, rain and organic solids such as leaves. Nutrients, such as nitrogen and/or carbon and/or phosphorous are nutrients required by all organisms and is therefore a limiting factor in growth of algae or multiplication of pathogenic bacteria.

Thus by first reducing algal causing nutrients (for example phosphorous) in the water, it becomes easier to control algal growth using alternative methods to chlorination. It will be appreciated that the steps of reducing the concentration of nutrients in the water and dosing the water with metal ions are separate and distinct operation, where nutrient reduction is upstream of dosing with metal ions.

The step of dosing the water with metal ions may be termed ionic addition.

The dosing of metal ions into water is not normally performed for the effect of pathogen and algae control due to the high dosages required, which in itself would be above standards for safe water and would be impractical and would be difficult to actually input in the required concentrations. This is believed to be due to the formation of metal-humic acid complexes, which are of high molecular weight and are therefore relatively stable and also that humic acids have been found to adsorb directly onto algal cells thus shielding direct the direct adsorption of free metal ions onto the algal cells at the organism-water interface. This means the toxicity of the metal ions to algal cells is reduced. However, the applicant has realised that in the event of low nutrient levels in the water, dosing of metal ions can be performed with relative ease in concentrations necessary to provide anti-algal protection and also affects the ability of any algae present to take up nutrients (such as phosphates) from the water. Accordingly, the ability to both reduce nutrient levels and dose metal ions into the water work in synergy to remove or at least significantly reduce the requirement to introduce harmful levels of chemicals.

It is believed that the addition of metal ions to the water causes inhibition of uptake of nutrients by algae. Thus, uptake of nutrients from the water not already extracted by the provision of the mechanical nutrient reducing arrangement by the algae is inhibited due to the provision of the metal ions. This is particularly relevant in swimming pool systems where nutrients are being regularly input due to bathers.

The dosing step preferably comprises dosing zinc and/or titanium ions into the water. The metal ions may be dosed into the water in a dosing agent. The dosing agent is preferably in liquid form. The dosing agent preferably comprises a metal compound dissolved in a carrier, where the carrier is preferably an acid. It has been found that the concentration of metal ions in solution can be increased by dissolving the metal compound in an acid. The acid is preferably citric or acetic acid. By dosing in this form, the metal compound remains in an aqueous solution and resists precipitation out of the solution, particularly when introduced into the water where the environment is of a higher pH. By maximising the concentration of metal compound dissolved in aqueous solution, the dosing of metal ions is maximised for the minimal volume of acid necessary to be introduced. Once in the water the metal ions diffuse to and effectively harm the microbial cells (such as algae and bacteria) in addition to inhibiting uptake of nutrients by the algae. An example of a suitable metal compound is a metal oxide.

The dosing agent may further comprise hydrogen peroxide. The effect of the addition of hydrogen peroxide is to increase the toxicity of the dosing solution to pathogenic bacteria.

The dosing step preferably comprises dosing water to be remediated with ions of zinc and/or titanium. Zinc ions are preferable metal ions as human exposure to zinc is not only harmless but is essential except for in high concentrations (e.g., over 5 mg/L). It is also lower cost than titanium.

A further benefit associated with the addition of a metal oxide dissolved in a carrier is that the inclusion of metal oxide itself has a known photocatalytic effect. So, the method may comprise dosing the water with metal oxide. This may be achieved by increasing the metal oxide in the carrier beyond the point at which it can all dissolve, or alternatively dosing separately. For example, it is known that metal oxides such as zinc or titanium oxide work well in photocatalytic reactions due to high light absorption capabilities, charge transport properties and excitation lifetime. The production of $O_2$ and OH radicals results in reaction with organic material including algal and biological (pathogenic) cells. Thus, the introduction of metal oxide in combination with metal ions further improves the water treatment capability.

An alternative step for dosing the water with metal ions is to perform electrolysis. Here, an electrical current is passed across the water and a metal (e.g., zinc) either forming the cathode or presented into the current flowpath thus releasing free metal ions, into the water.

The metal ions are preferably dosed to a concentration of metal in the water of less than 4 mg/L, even more preferably less than 3 mg/L. The minimum concentration of metal in the water is preferably 0.2 mg/L. The concentration of metal ions, preferably zinc, to be dosed is less than that deemed safe for drinking water standards. The World Health Organisation suggests 3 mg/l as being an upper limit, and the method according to the present invention treats water at such levels, meaning the water is safe to drink. The preferred concentration of the dosing agent is between 20 and 100 g/l, even more preferably between 50 and 90 g/l, even more preferably between 70 and 85 mg/l, and even more preferably approximately 80 mg/l. Such a concentration range has been found to be suitable to prevent reprecipitation of the metal compound out of solution over time.

The step of reducing the concentration of nutrients in the water preferably comprises passing the water through a filter. Filtering is preferably achieved utilising a biofilter. The filter may comprise an ion exchanger and/or an adsorbent, and thus comprise a step of ion exchange/adsorption. The ion exchanger may comprise for example activated alumina or iron hydroxide. This has the effect of removing phosphorous via an ion exchange and/or an adsorption process.

The step of reducing the concentration of nutrients in the water may comprise a step of dosing the water with a flocculant to cause the nutrients to combine with the flocculant to form a floc. The method may comprise filtering the floc. For example, the flocculant may comprise a coagulant for binding with the nutrients, where the bound additive/nutrient may be filtered from the water. The flocculant may for example comprise alum or chitosan.

The method may further comprise the step of oxygenating the water. This reduces the possibility of reduced dissolved oxygen levels in the water (i.e. less than 8 ppm) which may be caused by algae growth and may result in the growth of dangerous anaerobic bacteria. For this reason, the water is preferably oxygenated to ensure dissolved oxygen levels of between 8-20 ppm, even more preferably 10-20 ppm, even more preferably 8-10 ppm via a oxygen concentrator. This super saturation of oxygen increases the oxidative effects of the ions and hydroxyl radicals.

The method may also comprise the step of applying UV light to the water. This acts as a sterilising effect and is harmful to pathogens. The application of UV light is preferably downstream of the oxygenation step if present. An additional effect of UV light is to increase the photocatalytic effect of any metal oxide present in the water. In addition to UV light, the water may be treated with ozone, and or hydrogen peroxide to cause an increase in generation of disinfecting oxidising agents.

The method may comprise a secondary stage of reducing the concentration of nutrients in the water. The secondary stage may comprise one or more of passing the water through a nutrient adsorbing filter, delivering a flocculant to the water and removing the floc or passing through a further filter and/or passing the water through an ion exchanger and/or adsorbent. The further stage is beneficially different to the primary stage.

The method may further comprise controlling the pH of the water. The pH of the water is preferably controlled to be range from 7.5-8.5, even more preferably between 7.9-8.3.

pH control is preferably carried out downstream of delivery of metal ions into the water and downstream of mechanically reducing the concentration of nutrients in the water. The pH may be controlled by dosing with a pH controlling agent, preferably calcium and/or magnesium carbonate, preferably in liquid form. The effect on the water by controlling pH in this manner is that the efficacy of the algae minimisation by the introduction of metal ions and reduces the amount of ions to be introduced meaning the concentration is maintained at safe levels. The pH can be automatically monitored, and the pH buffering agent is introduced as required to maintain the pH in the preferred band. Alternatively, as pH tends to remain reasonably consistent it may be checked after predetermined time periods such as around every three months.

The method may further comprise in some circumstances (where a biofilter is not used) dosing low levels of disinfectant into the water (such as for example hydrogen peroxide) for further certainty in ensuring pathogen control and also for interacting with any dangerous bacteria that might accumulate, particularly in the mechanical nutrient reducing arrangement. It will be appreciated, however, that the levels of dosing are extremely low compared to known methods and associated systems.

Also according to an aspect of the present invention there is a water remediation system comprising:

an arrangement for reducing nutrients in the water;

metal ions for algae and/or pathogen control;

a delivery arrangement for delivering the metal ions into the water.

The water remediation system is preferably a swimming pool remediation system but can be used in lakes, ponds, rainwater harvesting systems or any freshwater bodies where there is input of nutrients such as phosphorous and therefore risk of algal growth.

The delivery arrangement of the metal ion solution preferably comprises a pump and a container for receiving the metal ions to be delivered, the pump arranged to pump the metal ions from the container into the water. Even more preferably comprises a peristaltic pump. Such pumps are well known in dosing additives into swimming pools for example.

The mechanical nutrient reducing arrangement preferably comprises a filter. Alternatively or in addition the filter comprises a biofilter. The filter may comprise an ion exchanger and/or adsorbent. The ion exchanger may comprise for example activated alumina or iron hydroxide. This has the effect of removing phosphorous via an ion exchange/adsorbance process.

The arrangement for reducing nutrients in the water may comprise a dosing arrangement comprising a flocculant. A flocculant is beneficial for removal of solid materials suspended in water. The floc can be removed by mechanical means such as a filter as the floc floats to the surface (flotation) or settles to the bottom (sedimentation). The dosing arrangement for dosing the flocculant may comprise a pump and a container, where the pump is arranged to pump flocculant from the container to the water.

An alternative or additional nutrient reducing arrangement may comprise an electrolysis apparatus for dosing a flocculant in the form of iron ions. These iron ions cooperate with the nutrients to form a floc which sinks and which can be removed by any mechanical filter, settling tank or robotic vaccuum.

The filter may comprise a housing having a water inlet and an outlet, the housing defining a filtration chamber therein, the filtration chamber having filter media therein comprising a plurality of at least partially porous filtration beads.

Surprisingly, the mechanical nutrient reducing arrangement preferably comprises a biofilter whereby the beads in the biofilter are at least partially coated with a bacterial culture. A suitable bacterial culture is commercially available and comprises a pre-established nitrifying bacteria community (widely available, for example Biological Preparations Limited, Beaufort Studio, Atlantic Wharf, Cardiff, CF10 4AH). However, given water movement, and time, a natural bacterial community will also colonise the filter with a healthy and active biofilm, but addition of a bacterial culture accelerates this process. At concentrations of zinc ions according to the invention the biofilms will still thrive as are more resilient to the zinc ions than free algal cells. Biofilms are known to be hard for chemicals to penetrate.

The plurality of beads are each preferably porous through the entire bead, consequently allowing bacteria to colonise the whole bead. The beads are also preferably hydrophilic. Such a structure provides structural integrity whilst maximising the surface area for beneficial bacteria to inhabit and maximises the contact area for the water flow. The beads are preferably substantially spherical. This further maximises the surface area of the beads; higher surface area means higher bacterial cell numbers within the biofilter. The beads preferably have a dry average material density of 0.1 to 0.9 kg/litre, and even more preferably 0.2 to 0.5 kg/litre, and substantially 0.35 kg/litre. The relatively low density means that the backwash water pressure used to clean the beads can be reduced due to the natural positive buoyancy of the beads. The beads themselves, however, will not float due to their inherent porosity but will readily become agitated, and the filter bed becomes semi-fluidised, during the backwash process.

An important advantage of the density and thus relative buoyancy of the beads allows air to be introduced during the backwash/cleaning phase which would otherwise be difficult. This air scour step further improves the cleaning procedure and maximises the nutrient removal from the beads.

The beads preferably comprise a diameter of between 10-30 mm and even more preferably between 15-25 mm. This improves packing density. The beads preferably have a diameter tolerance of +/−2 mm.

The beads are preferably ceramic which has been found to provide improved adhesion for bacteria (eg, in comparison to plastic media).

The chamber is preferably defined by chamber walls, and the beads are preferably unconstrained in the chamber. This means that the beads are able to readily move and rearrange their relative positions during a backwash cycle thereby improving the ability to effectively clean the beads. The ability to easily backwash the filter media is a significant benefit of the present invention as significant time and energy costs can be reduced due to the fact the move in the chamber resulting from density and thus relative buoyancy.

The filter media preferably comprises primary filter media, and the filter chamber preferably further comprises a plurality of secondary filter media different to the primary filter media. The primary filter media are preferably substantially the same within tolerances. The secondary filter media preferably comprises a plurality of substantially non-porous filtration media. This second class of filter media are preferably provided to act as a particulate filter thereby trapping particulate matter that is present in the water (known as a mechanical sieve). This trapped matter is held until the filter is backwashed (flow is reversed), and which time the particulate matter rises to the surface of the water in the filter and can be mechanically removed. Such secondary filter media can beneficially trap particulate material as small as 2-10 microns. In the time between backwashes, the trapped particulate matter is also utilised and broken down by the bacterial population within the filter.

The secondary alternative filter media preferably comprise a silicate. The silicate may comprise glass. Environment Glass Filter Media (EGFM) is an example of a suitable material for the secondary filter media and may comprise a blend of silicates manufactured by fusion of quartz sand, limestone, soda ash and recycled glass.

The primary and secondary filter media are beneficially not segregated from each other in the chamber. The secondary beads preferably have a negative buoyancy, meaning they sink in water. The density of the secondary beads is greater than 1 kg/litre.

The secondary filter media preferably has a maximum dimension of 0.2-1.5 mm and even more preferably between 0.8-1.0 mm. It is beneficial that the secondary filter media has a size gradient between 0.2 mm and 1.5 mm. The combination of smaller to larger secondary filter media improves particle separation.

It will be appreciated that due to the difference in densities, the primary and second filter media do not generally mix in the chamber, and the primary filter media sits above the secondary filter media.

The secondary filter media is preferably antimicrobial. A commercially available and suitable secondary filter media may be Activated Filter Media (AFM). The antimicrobial properties of AFM help reduce biofouling comprising growth of unwanted microorganisms on a surface of the filter media. Biofouling causes the media to "gel" together and reduces filter efficiency.

In an embodiment, the water filtration system further comprises a second filter in fluid communication with the first filter, the second filter comprising a further housing having a water inlet and an outlet, the further housing defining a further filtration chamber therein, wherein the filter media in the first filtration chamber comprises primary filter media, and the secondary filter chamber further comprises a plurality of secondary filter media different to the primary filter media. Thus, the first and second filter media are provided in separate filter chambers. The order of the first and second filter with the different filter media therein may be order appropriate to the water to be treated. For example, in very dirty water, the second filter may be positioned upstream of the first filter.

The provision of the primary and secondary filter media ensures that both phosphate levels, pathogen and particulate levels in the water are controlled, firstly via microbial absorption and secondly by mechanical filtration.

The apparatus preferably further comprises an arrangement for oxygenating the water. The arrangement may comprise a known oxygenator such as a hollow fibre oxygenator. A pump may be provided to feed air to the hollow fibre oxygenator. The addition of an oxygen concentrator can also be included to supersaturate the water with oxygen, thereby increasing the ORP of the water.

The system may further comprise a light emitting arrangement for emitting UV light to the water. The light emitting arrangement is preferably downstream of the oxygenator is present.

A dosing arrangement is preferably provided for dosing the water with a pH controlling agent. The dosing arrangement preferably comprises the pH controlling agent, wherein the pH controlling agent preferably comprises calcium and/or magnesium carbonate, preferably in liquid form.

The system may comprise a secondary nutrient reducing arrangement different to the primary nutrient reducing arrangement. Accordingly, multiple nutrient reducing arrangements may be utilised in tandem.

The system is beneficially suitable for inclusion into a loop system whereby water is recirculated.

BRIEF DESCRIPTION OF THE DRAWINGS

Aspects of the present invention will now be described by way of illustration only with reference to the accompanying drawings where.

DETAILED DESCRIPTION OF THE INVENTION

Nutrients such as phosphorus, carbon and nitrogen are key nutrients required by all organisms for the basic processes of life and is therefore control of these nutrients is a limiting factor when it comes to the growth of algae or multiplication of pathogenic bacteria. Phosphorus in pool water is usually found in the form of phosphates. Phosphates can be in inorganic form (including orthophosphates and polyphosphates), or a more complex, organic form (organically bound phosphates). Organics in water may be in dissolved, suspended, settled, or floating states.

Inorganic orthophosphates and/or polyphosphates are generated when complex organically bound phosphates (from swimmer or environmental input) break down into simpler, ortho phosphorous compounds which are more reactive with algal cells and bacteria. Once this process occurs, these molecules become highly bio-available to algae and other life forms (e.g. pathogenic aquatic bacteria) and cannot easily be removed purely by mechanical filtration without the need for coagulants or removal via dilution of the pool water.

The majority of current filtration systems fail to effectively and continually remove both organic and inorganic nutrients (in particular phosphates). In particular, various forms of algae are well evolved at utilising nutrients to grow, and in a non-limited carbon or nitrogen environment, it is known that as little as 3 mg of phosphorous can result in I dry Kg of algal matter.

Instead of dealing with the causes of algal and pathogen growth (ie: nutrient load), the majority of current pool water treatment and filtration systems deal with the potential effects of high nutrients (ie: algae and aquatic pathogens) in the water. This is usually achieved by utilising basic mechanical filtration (eg: a sand filter), in combination of excessive and unnecessary chemical usage whilst also requiring high rates of water circulation, thereby creating unnecessary electrical demand.

Figure 1:
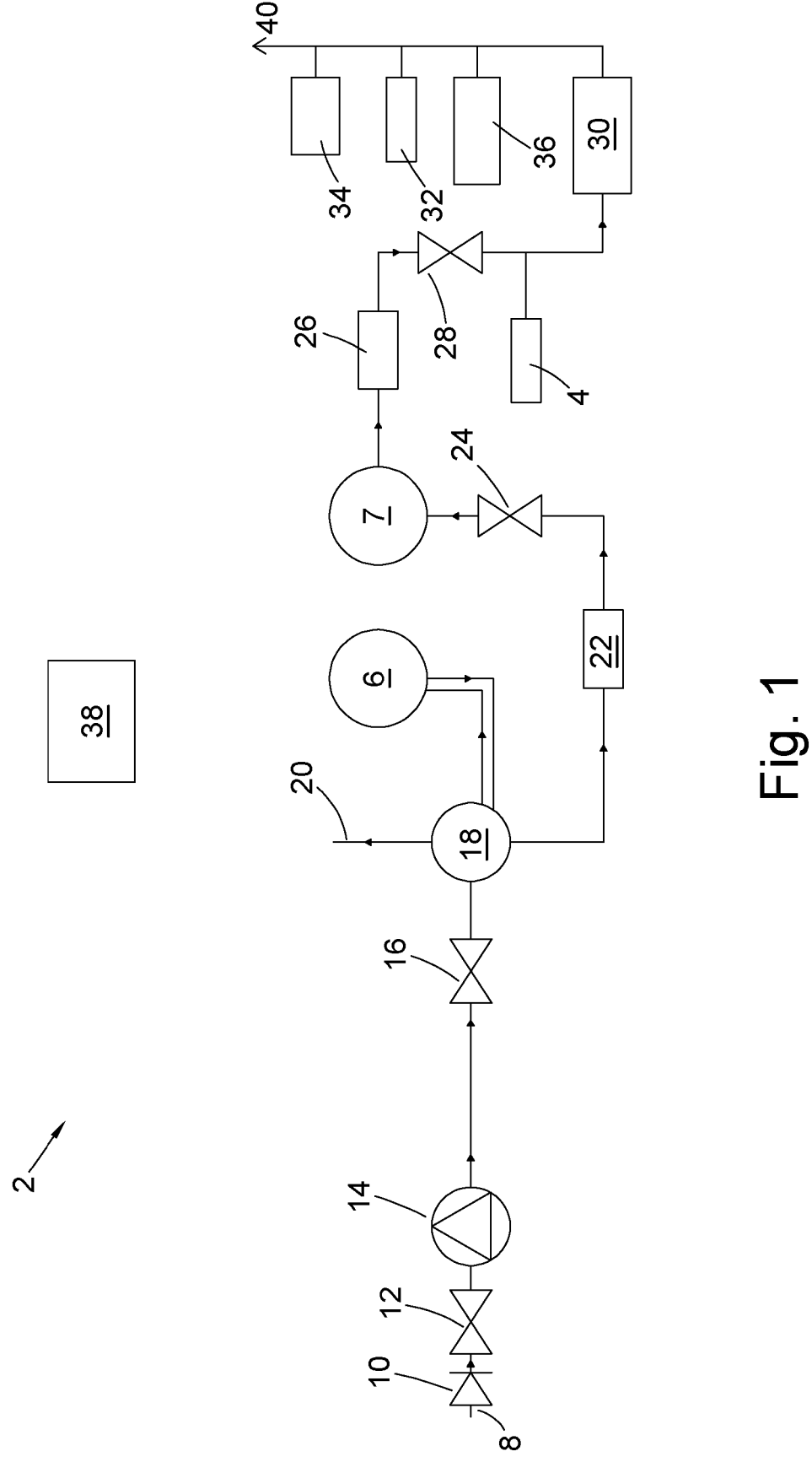
FIG. 1 is a schematic representation of a water treatment system according to an illustrative embodiment of the present invention.

With reference now to FIG. 1 a schematic representation of a system 2 according to an illustrative embodiment of the present invention is presented. In this system there is both the provision of a dosing arrangement 4 capable of dosing metal ions (preferably zinc ions) into the water to be treated and the provision of a nutrient reducing arrangement for reducing the concentration of nutrients present in the water comprising a first stage arrangement 6. In the schematic diagram represented a second stage 7 for reduction of nutrients in the water is presented which will be described further below and is in effect a back-up or auxiliary stage.

Referring to FIG. 1 from left to right a water remediation system 2 is presented having an inlet 8 which passes through a non-return valve 10. Water then passes through a valve 12 in a form of a ball valve which can be used to shut off water passage through the water remediation system 2 as required for, for example, maintenance purposes. A water pump 14 is then provided which may comprise, for example, a 1.1 kW pump having a power output appropriate to the size of system in which it is installed. The flow path passes through a further valve 16 and into a further valve arrangement 18 which is arranged to enable a change of water flow direction into the first stage arrangement 6. In a first configuration the valve 18 allows water flow which is directed to top of the first stage arrangement 6 when which the water flow passes through the first stage arrangement 6 and out of the lower end and then passes back to the valve 18. This is the normal operational state of the water treatment system 2. However, valve 18 enables a backwash configuration whereby the flow direction through the first stage arrangement 6 is changed meaning that the flow passes from the lower end of the first stage arrangement 6 out through the upper end and back to the valve 18 and then out of the valve 18 to the waste outlet 20. The first stage arrangement 6 is beneficially a filter arrangement and as such after a pre-determined period of time the filter will have captured solid matter which must be cleared from the filter.

Under normal operation water passing from the first stage arrangement 6 back to the valve 18 will then travel through a flow meter 22 which measures the rate of flow through the system, through a further valve 24 and into a second stage arrangement 7. Operation of the second stage arrangement 7 will be described in more detail below. Water then exits the second stage arrangement 7, passes through a further flow meter 26, further valve 28 and passes by dosing arrangement 4 capable of dosing metal ions into the water to the treated. Further optional but preferable features of the water remediation system 2 comprise a UV treatment stage 30, a further dosing arrangement 32 and an oxygen diffuser 34. A sensor 36 may be provided for measuring temperature of the water passing through the water remediation system 2. An outlet 40 is then provided. The outlet in a pool system is connected to a pool inlet where treated water is fed back into the pool.

A control system 38 is provided for controlling operation of the water treatment system 2 in response to measured parameters. Feedback is provided in real time with respect to monitored attributes of the water, such as pH and metal ion concentration such as a heavy metal sensor. In one mode the dosing pump 4 can be triggered to dose a temporary shock dose of metal ions in order to clear any temporary problem of excess algae or water quality, or in the event of for example a high nutrient event such as a pool party or dust storm. The control system also beneficially operates control of the valve 18 to cause a backwash cycle of the first stage filter arrangement 6.

A further sensor may be provided for monitoring turbidity and provides feedback in real time to the control system in order that dosing of the metal ions can be adjusted dependent on measured values.

In one aspect the delivery arrangement for delivering metal ions into the water comprises a dosing arrangement such as a dosing pump that dispenses metal ions from a container. The metal ions can be dosed as required and the container replenished as necessary. In an alternative embodiment however the delivery arrangement may comprise an electrolysis apparatus. The electrolysis apparatus comprises an anode and a cathode configured such that the water is between the anode and cathode which may be made of known suitable materials such as carbon, titanium or steel. Current is passed between the anode and cathode through the water. In one embodiment a metal such as zinc in the form of a rod or sheet for example is introduced in the current pathway flowing between the anode and cathode causing ionisation and thus providing zinc ions in the water. In another embodiment zinc may be used as the anode and/or the cathode which has the same effect of delivering zinc ions into the water.

Figure 2:
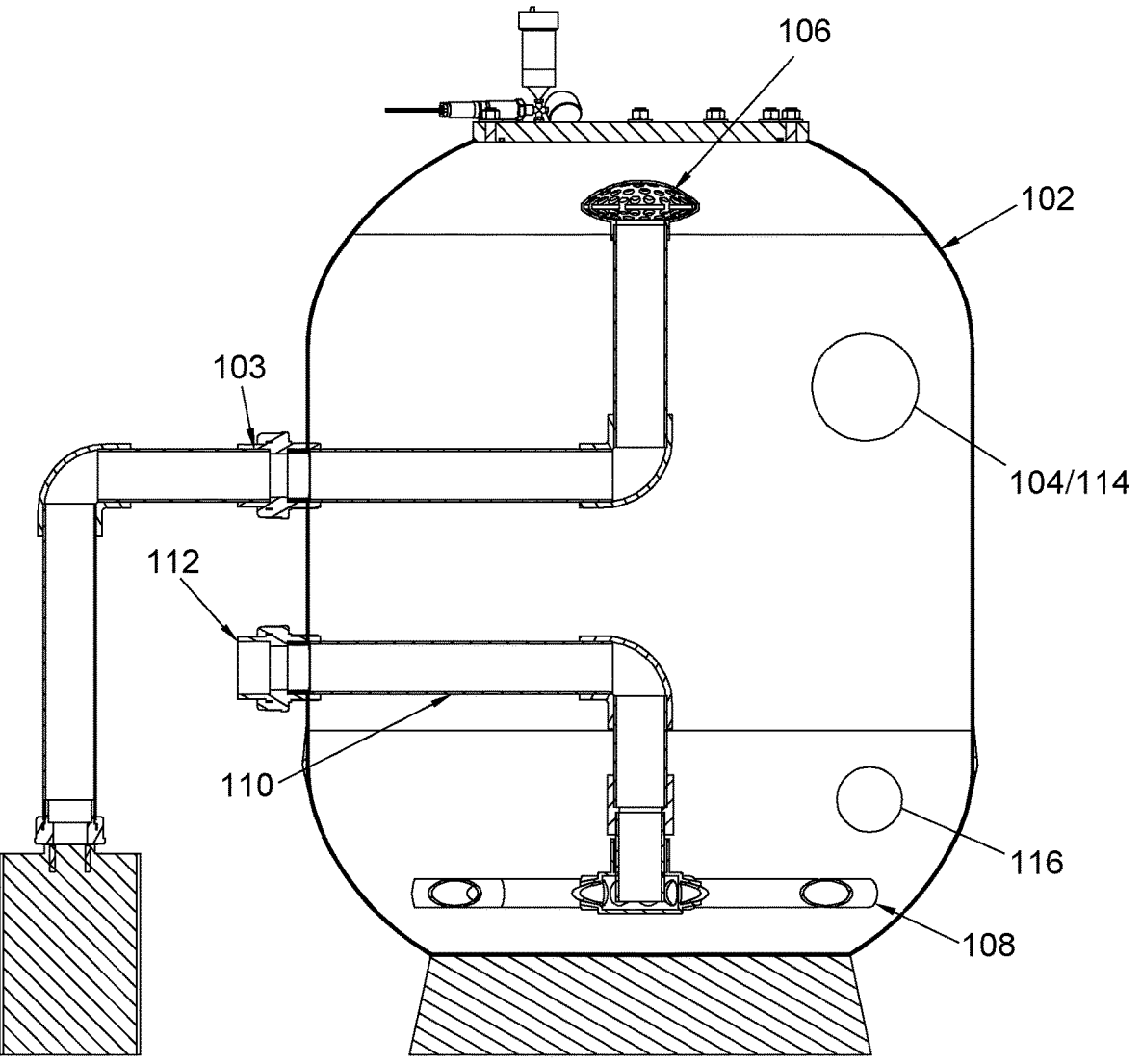
FIG. 2 is a schematic representation of an illustrative filter for reducing the nutrients in a system according to an illustrative embodiment of the present invention.

In one embodiment the first stage arrangement 6 comprises a mechanical nutrient reducing arrangement for reducing the concentration of nutrients present in the water and comprises a filter as presented in an illustrative embodiment in FIG. 2. Presented is a housing 102 defining a filtration chamber 104 therein. The housing 102 comprises a connector 103 and a pathway 104 extending from the connector 103 to an inlet 106 provided at the upper end of the filtration chamber 104 for releasing water into contact with the filter media. A water collector 108 in the form of an outlet is positioned at the lower end of the filtration chamber 104 for collecting water that has passed through the filter media which in turn transfers the water through pathway 110 and out through a second connector 112.

Figures 3A, 3B:
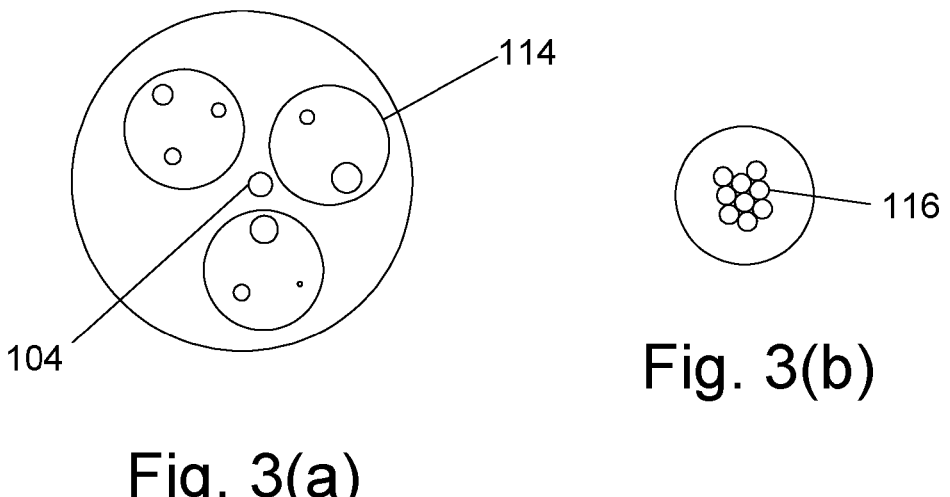
FIGS. 3a and b are schematic representations of filter media in the filter as presented in FIG. 2 according to an illustrative embodiment of the present invention.

Provided within the filtration chamber 104 is filter media comprising a plurality porous filtration beads 114. The generally spherical beads 114 themselves are schematically presented in FIG. 3a and are porous through the entire bead. Such a structure provides structural integrity whilst maximising the surface area for bacteria to inhabit and maximises the contact area for the water flow. This further maximises the surface area of the beads. The beads have a dry density of approximately 0.35 kg/litre. The relatively low density means that the backwash water pressure (which is when the flow direction is reversed in order to clean the beads and remove solid matter from the filter) is reduced due to the natural positive buoyancy of the beads. The beads 114 themselves however will not float due to their inherent porosity but will readily become agitated during the backwash process. The beads 114 comprise a diameter of between 15-25 mm with a diameter tolerance of +/−2 mm. The beads 114 are preferably ceramic which has been found to provide improved adhesion for bacteria when used as a biofilter.

The beads are unconstrained in the chamber. This means that the beads are able to readily move and rearrange their relative positions during a backwash cycle thereby improving the ability to effectively clean the beads. During a backwash cycle when the flow direction is reversed a valve (not shown) is closed to prevent water exiting through the inlet 103 and dirty water exits the chamber 104 from an upper end of the housing 102, controlled by another valve (not shown).

Provided within the filter chamber 104 are a plurality of secondary filter media 116 also schematically represented in FIG. 2b. The secondary filter media comprises a plurality of substantially non-porous filtration media. There is no segregation between the primary and secondary filter media. The secondary filter media comprises a silicate such as glass and is not porous.

The primary and secondary filter media are beneficially not segregated from each other in the chamber. The secondary beads preferably have a negative buoyancy, meaning they sink in water. The density of the secondary beads is greater than 1 kg/litre. The secondary filter media 116 has a maximum dimension of between 0.8-1.0 mm. It is beneficial that the secondary filter media has a size gradient between 0.2 mm and 1.5 mm. The combination of smaller to larger secondary filter media improves particle separation. It will be appreciated that due to the difference in densities, the primary and second filter media do not mix in the chamber, and the primary filter media sits above the secondary filter media.

In operation the secondary filter media act as a particulate filter thereby trapping particulate matter that is present in the water. This trapped matter is held until the filter is backwashed, and which time the particulate matter rises to the surface of the water in the filter and can be mechanically removed. Such secondary filter media can beneficially trap particulate material as small as 4 microns. The primary filter acts to control the phosphate levels in the water. In a preferred embodiment the beads 114 are at least partially coated with a bacterial culture.

Alternative embodiments of the first stage arrangement 6 will now be described.

In an alternative embodiment, the first stage arrangement 6 may comprise a dosing arrangement may be provided for dosing an additive (e.g. a flocculant) into the water. A flocculant is beneficial for removal of solid materials suspended in water. The floc can be removed by mechanical means such as a filter as the floc floats to the surface (flotation) or settles to the bottom (sedimentation). Alternatively, the floc may be removed by a mechanical means, for example may be sucked from the floor of a swimming pool. Suitable flocculants include for example aluminium sulphate (alum). Another means of introducing flocculant to the water is to dose the water with iron ions. This may be achieved both through dosing as a solid or liquid via a dosing arrangement, or alternatively through electrolysis.

In an alternative embodiment other filter configurations are suitable for nutrient removal and may comprise fine filters utilising physical particulate removal without beads as described above.

In an alternative embodiment another first stage arrangement may be to utilise a nutrient adsorbing filter comprising an ion exchanger. The ion exchanger may comprise for example activated alumina or iron hydroxide. This has the effect of removing phosphorous via an ion exchange and adsorption process. Such ion exchangers are replaceable as the ion exchanger is used up and becomes saturated over time.

It will be appreciated that alternative methods and associated apparatus have been described for reducing nutrients in the water. It will also be appreciated that combinations of each may be included in a water remediation system. For example, in the system as described with reference to FIG. 1 both a biofilter and an ion exchange resin/adsorbent are utilised in tandem for improved nutrient reduction.

The system as presented in FIG. 1 comprises an arrangement for oxygenating the water in the form of the oxygen diffuser 34. This diffuser 34 may comprise a known oxygenator such as a hollow fibre oxygenator. A pump (not shown) may be provided to feed air to the hollow fibre oxygenator. Alternatively, microbubbles can be generated using a passive venturi effect to introduce oxygen. In any event the aim is to ensure dissolved oxygen levels of 8 ppm to 10 ppm.

Prior to operation data regarding the water system to be treated must be input in order that appropriate dosing levels of the agent are achieved. This calculation may be completed either onsite via the control system 38 or alternatively offsite at a remote server. Appropriate data such as water volume (or pool dimensions) and further may require agent concentration (optionally-but typically automatically determined). From this the volume of liquid agent to be added to the water can be determined.

The preferred concentration of the agent prior to dispensing is between 50 and 90 mg/l, even more preferably between 70 and 85 mg/l, and even more preferably approximately 80 mg/l. Such a concentration range has been found to be suitable to prevent reprecipitation of the metal compound out of solution over time, with a concentration of around 80 mg/l providing optimum results.

The agent is dosed via a dosing arrangement 4 which may be in the form of a peristaltic pump controlled by the control arrangement 38 where an initial dose is added to the water sufficient to achieve a desired concentration of 0.2 mg/l. The pump 4 is then controlled to regularly dose agent to the water dependent upon a measured concentration of agent. This can readily be measured using a colorimeter photometer, for example (not shown in the schematic diagram). Dosage of the agent can therefore be controlled accordingly.

The system according to the illustrative embodiment as presented in FIG. 1 further comprises a light emitting arrangement for emitting UV light to the water downstream of the oxygenator is present. The method may also comprise the step of applying UV light to the water. This acts as a sterilising effect and is an extra defence to the provision of the arrangement for mechanical reduction of the concentration of nutrients. The application of UV light is preferably downstream of the oxygenation step if present. The effect of UV light is to increase the photocatalytic effect of any metal oxide present in the water. In addition to UV light, the water may be treated with ozone to effect an increase in generation of disinfecting oxidising agents.

The dosing arrangement 32, such as a further peristaltic pump, is presented in the illustrative embodiment downstream of the first and second stage filter arrangements 6,7 and is provided for dosing the water with a pH controlling agent. The dosing arrangement doses a pH controlling agent such as calcium and/or magnesium carbonate in liquid form in order that the pH of the water is maintained at a preferred pH of between 7.9-8.3.

The second stage arrangement 7 may be present for additional nutrient control. The second stage arrangement 7 comprises a secondary nutrient reducing arrangement comprising a nutrient adsorbing filter, where the nutrient adsorbing filter comprises an ion exchanger such as an activated alumina or iron hydroxide filter. It will be appreciated however that although increasing the effectiveness of the system, it is not essential for the system to function.

Aspects of the present invention have been described by way of example only and it will be appreciated to the skilled addressee that modifications and variations may be made without departing from the scope of protection disclosed herein.

The invention claimed is:

1. A method of remediating water, the method comprising:
    a first operation comprising reducing the concentration of nutrients in the water by filtering the nutrients from the water; and a second operation performed downstream of the first operation, the second operation comprising dosing the water with metal ions by adding a liquid dosing agent to the water, wherein:

the liquid dosing agent comprises a metal compound dissolved in an acid to produce the metal ions; and the metal ions comprise zinc ions and/or titanium ions.

2. The method according to claim 1, wherein the metal compound is a metal oxide.

3. The method according to claim 1, wherein the metal ions are dosed to a concentration of metal in the water of less than 5 mg/L.

4. The method according to claim 1 wherein a concentration of metal ions in the dosing agent is between 20 and 100 g/l.

5. The method according to claim 1 wherein filtering the nutrients from the water comprises using a mechanical sieve filter.

6. The method according to claim 1 wherein filtering the nutrients from the water comprises using an ion exchanger.

7. The method according to claim 1, wherein the step of reducing the concentration of nutrients in the water comprises dosing the water with a flocculant to cause the nutrients to combine with the flocculant to form a floc.

8. The method according to claim 1, comprising the step of applying UV light to the water.

9. The method according to claim 1, further comprising controlling the pH of the water to be range from 7.5-8.5.

10. The method according to claim 1, comprising supersaturating the water using an oxygen concentrator apparatus.

\* \* \* \* \*